United States Patent [19]
Jorgensen

[11] 3,737,977
[45] June 12, 1973

[54] METHOD OF FORMING CERAMIC-METAL SEAL

[75] Inventor: Paul J. Jorgensen, Cupertino, Calif.

[73] Assignee: General Electric Company, Schenectady, N.Y.

[22] Filed: Oct. 19, 1970

[21] Appl. No.: 82,126

Related U.S. Application Data

[60] Division of Ser. No. 825,086, Nov. 14, 1968, Pat. No. 3,598,435, which is a continuation-in-part of Ser. No. 749,069, July 31, 1968, which is a continuation-in-part of Ser. No. 500,311, Oct. 21, 1965.

[52] U.S. Cl. .............. 29/472.9, 65/59, 287/189.365
[51] Int. Cl. ............................................ B23k 31/02
[58] Field of Search ...................... 29/472.9; 65/59; 287/189.365; 220/2.1 A, 2.3 A; 313/220, 221

[56] References Cited
UNITED STATES PATENTS

| | | |
|---|---|---|
| 3,243,635 | 3/1966 | Louden et al. ....................... 65/59 X |
| 3,281,309 | 10/1966 | Ross ..................................... 65/59 X |
| 3,370,874 | 2/1968 | Scherer et al. .................. 29/472.9 X |
| 3,473,071 | 10/1969 | Rigden et al. ...................... 313/220 |
| 3,479,170 | 11/1969 | Louden ................................... 65/59 |
| 3,385,463 | 5/1968 | Lange ...................... 287/189.365 X |

Primary Examiner—J. Spencer Overholser
Assistant Examiner—Ronald J. Shore
Attorney—John F. Ahern

[57] ABSTRACT

An improved seal or bond between a refractory metal body and a translucent alumina ceramic body is disclosed wherein the metal surface to be bonded to the alumina body is comprised of zirconium, either as a metallic coating thereon, diffused therein by "metalliding," as an alloying constituent, or as the major constituent of the metal body. The bond is effected by means of an alumina glass between the zirconium present at the surface and the adjoining alumina ceramic surface, at least a portion of the zirconium being oxidized by the molten glass during the formation of the seal.

3 Claims, 1 Drawing Figure

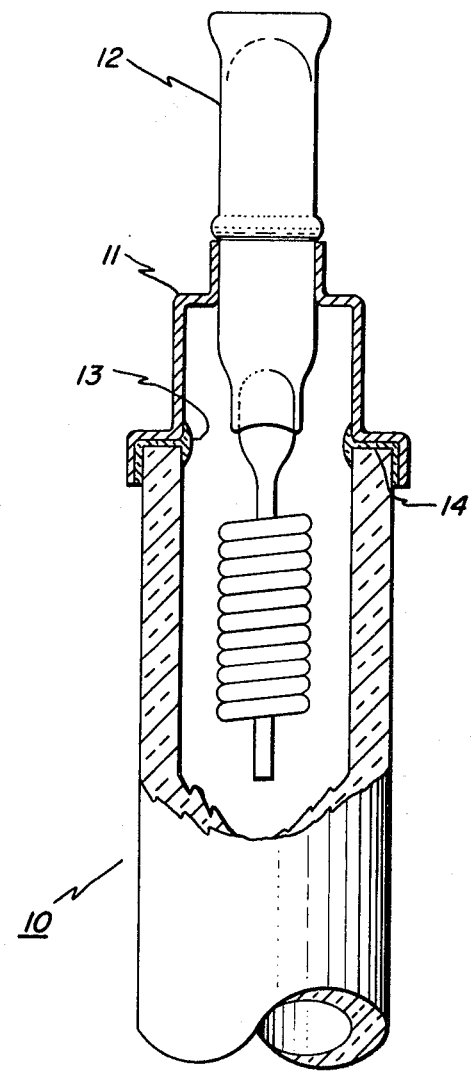

METHOD OF FORMING CERAMIC-METAL SEAL

This is a division of co-pending application Ser. No. 825,086, filed Nov. 14, 1968 entitled CERAMIC-METAL BONDING COMPOSITION AND COMPOSITE ARTICLE OF MANUFACTURE, now U.S. Pat. 3,598,435, which is a continuation-in-part of applicant's then co-pending application, Ser. No. 749,069, filed July 31, 1968, which was a continuation-in-part of Ser. No. 500,311 of the same inventor, filed Oct. 21, 1965, all assigned to the same assignee. Cross reference is made at this time to copending application Ser. No. 593,274 in the name of Newell C. Cook entitled "Process for Zirconiding and Hafniding Base Metal Compositions" filed on Nov. 10, 1966, now U.S. Pat. No. 3,479,158, and assigned to the same assignee.

This invention relates to the art of forming ceramic-to-metal seals and, more specifically, to those seals formed between a refractory metal joined to an alumina body by means of a seal having a high proportion of aluminum oxide therein and commonly used in "Lucalox" lamps. In these lamps, the vapors of alkali metals may attack the parts of the lamp and render them inoperative.

Heretofore, the bonding together of ceramic parts, either to other ceramic parts or to refractory metal parts, has generally involved applying a metal film to the ceramic oxide surface. Among the various existing processes is the molybdenum-manganese process which involves firing on the surface of the ceramic a mixture of manganese and molybdenum powders. In the hydride process, a hydride of titanium or zirconium is applied to the surface of the ceramic and decomposed by heating in a non-oxiding atmosphere to form a metal layer which can then be bonded with a ductile solder. U.S. Pat. No. 2,928,755, granted Mar. 15, 1960, is illustrative of the above.

An additional process is one referred to usually as the active alloy process. This process is one in which the parts are sealed together by forming a molten solder, including a reactive metal such as titanium or zirconium, between the parts to be bonded together. While these processes are useful in preselected situations, the operating temperatures to which the seals may be used and maintain their integrity are, in general, limited to the range of about 400°C to 600°C.

It is an object of the present invention to produce improved ceramic-to-metal seals.

The drawing is an enlarged sectional view of a portion of a lamp illustrating the metal-to-ceramic seal of the invention.

It has been found that when the refractory metal of the seal combination is coated with tungsten trioxide that the sealing glass used to join the alumina body to the refractory metal produces an improved product.

This sealing material produces a substantially better adhesion to the refractory metal. For example, in forming a sodium "Lucalox" lamp (one having alkali metal vapor therein) a niobium metal end cap may be coated with tungsten trioxide or active metal and then oxidize the active metal used during the sealing operation. An alumina glass is used as the seal between the niobium and the polycrystalline alumina body of at least 99.5 per cent alumina. The resulting seal, as completed, is recognized as a very fine seal.

Notwithstanding the excellence of the seal, the lamps fail in service. It is believed that the sodium vapor of the lamp during operation reduces the $WO_3$ producing porosity in the seal. This porosity allows the sodium in the lamp to be diffused into the seal and the lamp fails when the operative proportion is depleted. In general, a service life of not more than about 4,000 hours may be expected from lamps using this type of seal.

One embodiment of the present invention solves the above problem, by substituting zirconium for the tungsten trioxide, since $ZrO_2$ is not reduced by the sodium vapor during the lamp operation. With this substitution the seal is retained, improved adherence obtained and the lamp continues to operate for a long period of time. Hence, a superior ceramic-to-metal seal results.

With reference to the drawing, a portion of the arc tube assembly of such a lamp is illustrated. Arc tube 10 is composed of translucent polycrystalline alumina ceramic composed of at least 99.5 per cent alumina and having very nearly 100 per cent theoretical density. End cap 11 is manufactured from niobium or a zirconium alloy of niobium. Electrode assembly 12 extends through end cap 11 into the interior of the arc tube 10 as shown. The end cap 11 is sealed to the end of the arc tube 10 by means of a glass seal 13 which is bonded to a surface 14 of the end cap and to surfaces of the arc tube which are contiguous thereto, as shown. During operation of the lamp, the interior of the arc tube, the end cap and the glass seal are exposed to vapors of an alkali metal such as sodium at temperatures of the order of 800°C. In forming the seal, a suspension of finely ground sealing glass is applied to the end of the arc tube and the end cap is held in place while the assembly is heated to the melting point of the sealing glass, whereupon the glass melts and fills the space between the mating parts of the end cap and arc tube to form the illustrated seal when cooled.

The zirconium dioxide is formed on niobium by coating the refractory metal with zirconium hydride to an extent to have a continuous coating over the portion contacted by the sealing glass. The coating is then reduced to zirconium. Upon heating the coating refractory metal and aluminate sealing glass together, the zirconium alloys with the refractory metal and the zirconium at the surface forms an oxide that is incorporated with the sealing glass. Increased adherence is promoted. A zirconium hydride coating approximately one mil in thickness is the preferred embodiment, although more or less may be applied.

In another embodiment of the invention the zirconium dioxide may be also provided at the interfacial zone between the niobium end cap and the sealing glass by zirconiding the surface of the niobium body according to the process disclosed in the previously cross-referenced Cook application, such disclosure being incorporated by reference herein. In this process, a uniform tough, adherent coating of zirconium is formed on the niobium surface by an electrodeposition in a fused salt bath, said coating overlying a layer of zirconium diffused into the metal substrate. Under certain circumstances, it may be desirable to provide a zirconided surface comprising a zirconium rich niobium alloy by the diffusion of zirconium into the niobium surface with little or substantially no overlying zirconium layer.

Alternatively, a niobium-zirconium alloy may be employed such as one containing a small but effective amount of zirconium, balance substantially all niobium.

Under some circumstances, the end cap may be formed from substantially pure zirconium metal. As is well known, a phase change occurs in zirconium with an attendant change in the coefficient of thermal expansion at a temperature of about 862°C. If the temperature of the end caps during operation of the lamp equals or exceeds this temperature, pure zirconium may not be satisfactory, however, it is well known that the addition of relatively small amounts of elements such as oxygen, nitrogen, carbon, aluminum, hafnium or tin are effective to raise this transition temperature and such alloys are referred to as being "stabilized zirconium", and the end caps may be fabricated from such material, providing the stabilizing addition is chemically and physically compatible with the sealing glass and the sodium vapor.

Lamps made in accordance with this invention have exhibited a much improved service life of the order of 14,000 hours.

When reference is made in the claims to ceramic-to-metal seals, it is to be understood that glass-to-metal seals are included and vice versa.

Additionally, it will be understood that when reference is made to metallic zirconium in the claims, it is intended to include zirconium in either the pure or substantially pure state, as diffused into the surface of another refractory metal such as niobium, or present as an alloying constituent as distinguished from chemically combined zirconium as, for example, the oxide.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What I claim as new and desire to secure by Letters Patent of the United States is:

1. A method of forming a ceramic-to-metal seal comprising placing a surface of a polycrystalline alumina ceramic body in juxtaposition with a surface of a metallic niobium body, said metal surface comprising a zirconided layer of metallic zirconium diffused into the niobium and sealing the metal body to the ceramic by means of a sealing glass, whereby the zirconium at the surface of the zirconided layer is oxidized.

2. The method of claim 1 wherein the zirconided layer has an overlying layer of substantially pure zirconium.

3. The method of claim 1 wherein the sealing glass is predominantly formed of alumina.

* * * * *